United States Patent
Friedman et al.

(10) Patent No.: US 7,073,123 B2
(45) Date of Patent: *Jul. 4, 2006

(54) PARSING EXTENSIBLE MARKUP LANGUAGE (XML) DATA STREAMS

(75) Inventors: Greg S. Friedman, Redmond, WA (US); Christopher J Lovett, Woodinville, WA (US); Nanshan Zeng, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/271,931

(22) Filed: Nov. 10, 2005

(65) Prior Publication Data

US 2006/0069985 A1 Mar. 30, 2006

Related U.S. Application Data

(63) Continuation of application No. 10/841,401, filed on May 7, 2004, now Pat. No. 6,996,773, which is a continuation of application No. 09/361,784, filed on Jul. 26, 1999, now Pat. No. 6,763,499.

(51) Int. Cl.
*G06F 17/00* (2006.01)
(52) U.S. Cl. ........................ 715/513; 717/114
(58) Field of Classification Search ............... 715/513, 715/531; 717/114
See application file for complete search history.

(56) References Cited

U.S. PATENT DOCUMENTS

| 5,416,896 | A | 5/1995 | Motoyama |
| 5,483,629 | A | 1/1996 | Motoyama et al. |
| 6,249,844 | B1 | 6/2001 | Schloss et al. |
| 6,330,569 | B1 | 12/2001 | Baisley et al. |
| 6,463,440 | B1 | 10/2002 | Hind et al. |
| 2003/0005410 | A1 | 1/2003 | Harless |

OTHER PUBLICATIONS

Aho; "Compliers, Compliers: Principles, Techniques, and tools"; Mar. 1998.
W3C (World Wide Web Consortium) DOM Level 2 Working Draft at http://www.w3org/TR/1999/WD-DOM-Level-2-19990719, published on Jul. 19, 1999.

(Continued)

*Primary Examiner*—Stephen Hong
*Assistant Examiner*—Adam M. Queler
(74) *Attorney, Agent, or Firm*—Lee & Hayes, PLLC

(57) ABSTRACT

In one embodiment, a method of parsing an XML data stream comprises receiving an XML data stream containing a namespace prefix and an associated element tag name. The element tag name is associated with an element tag. The namespace prefix and the element tag name are converted into a token that uniquely represents a namespace specification that is associated with the namespace prefix and the element tag. A stack is defined and is configured to receive one or more tokens during parsing of the XML data stream. Parsing of the XML data stream is performed without requiring an XML tree structure comprising an XML document embodied by the XML data stream, to be built.

4 Claims, 12 Drawing Sheets

Element Stack

| $C_{Token}$, oldTopNamespace = ns3, [text accumulation buffer] |
| $B_{Token}$, oldTopNamespace = ns2, [text accumulation buffer] |
| $A_{Token}$, oldTopNamespace = 0, [text accumulation buffer] |

OTHER PUBLICATIONS

"SAX Implementation of a Namespace Parser Filter" by Cowan, http://ccil.org/cowan/XML. Dec. 6, 1998.

"Fundamentals of Computer Science I, Stacks and Queues," http://www.math.grin.edu/courses/Scheme/spring-1998/stacks-and-queues.html.

Namespaces in XML World Wide Web Consortium Jan. 14, 1999 http://www.w3.org/TR/1999/REC-xml-names-19990114/.

Huck et al., "Jedi: Extracting and Synthesizing Information from The Web"; IEEE, pp. 32-41, Aug. 1998.

Suzuki et al.; "Managing The Software Design Documents with XML", ACM, pp. 127-136; Sep. 1998.

Royappa; "Implementing Catalog Clearinghouses with XML and XSL"; ACM; pp. 616-621; Mar. 1999.

Jeuring et al.; "Generic Programming for XML Tools", http://archive.cs.uu.nl/pub/RUU/CS/techreps/CS-2002/2002-023.pdf.

Baker; "An XML Namespace Alternative"; http://www.biglist.com/lists/xsl=list/archives/199901/msg00076.html.

"What is an Event-Based Interface"; http://www.megginson.com/SAX/event.html.

"Quick Start for SAX Application Writers", http://www.megginson.com/SAX/quickstart.html.

The American Heritage Dictionary of the English Language, Third Edition, 1992 HOughton Mifflin Company. "Mapping".

Cowan, "Filters," http://web.archive.org/web/20000817101511/www.ccil.org/~cowan/XML/Filters.txt, last modified Sep. 14, 1998.

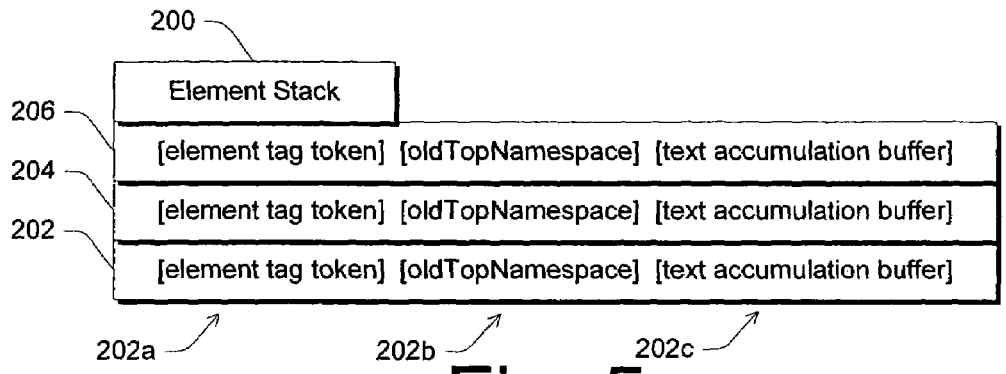
Fig. 5
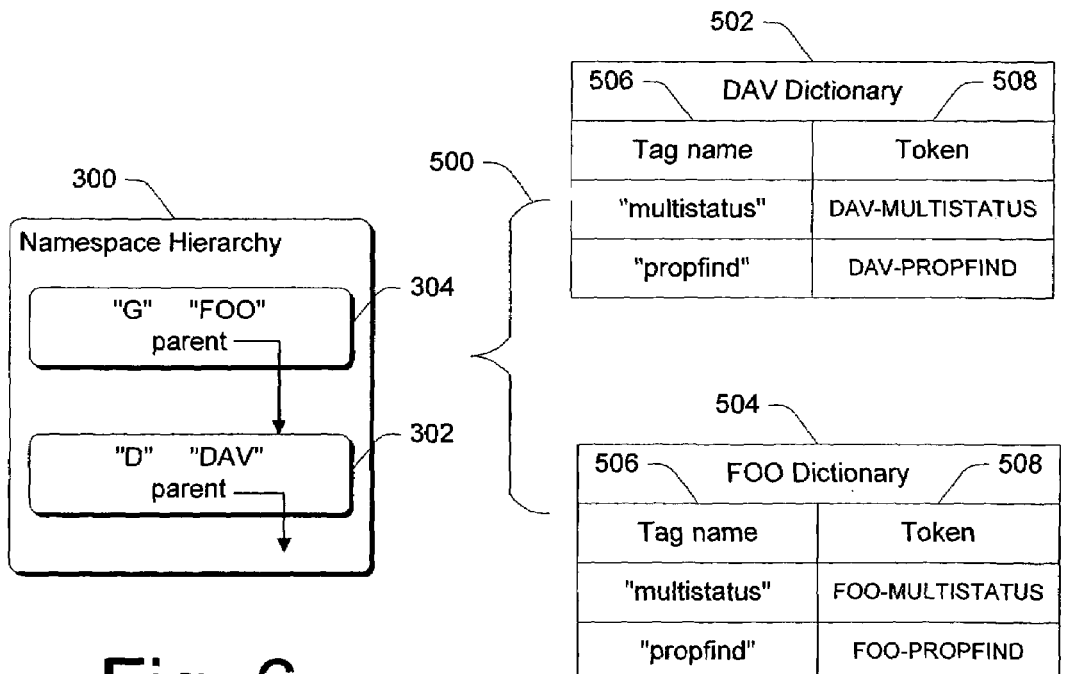
Fig. 6
Fig. 8

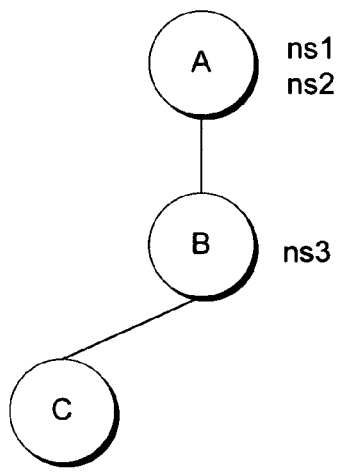
Fig. 12
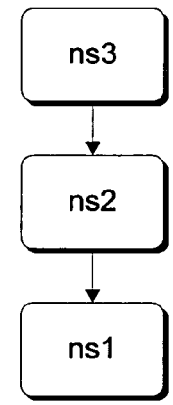
Fig. 13
| Element Stack |
|---|
| $C_{Token}$, oldTopNamespace = ns3, [text accumulation buffer] |
| $B_{Token}$, oldTopNamespace = ns2, [text accumulation buffer] |
| $A_{Token}$, oldTopNamespace = 0, [text accumulation buffer] |
Fig. 14

| Prefix | Expanded namespace | Scope | Unique Identifier |
|---|---|---|---|
| null | urn:123 | foo | |
| x | urn:456 | foo<br>pPreviousDefault | |
| y | urn:789 | bar | |
| null | urn:012 | joe<br>pCurrentDefault | |

Fig. 17

| Prefix | Expanded namespace | BaseName |
|---|---|---|
| null | urn:012 | item |

Fig. 18

| Prefix | Expanded namespace | BaseName |
|---|---|---|
| x | urn:456 | a |

Fig. 19

PARSING EXTENSIBLE MARKUP LANGUAGE (XML) DATA STREAMS

RELATED APPLICATION

This is a continuation of and claims priority to U.S. patent application Ser. No. 10/841,401 which, in turn, is a continuation of and claims priority to U.S. patent application Ser. No. 09/361,784, the disclosures of which are incorporated by reference herein.

BACKGROUND

Extensible Markup Language (XML) is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general-purpose language used to represent structured data without including information that describes how to format the data for display.

XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a strict tree-like structure. Each element forms a node in this tree, and potentially has "child" or "branch" nodes. The child nodes represent any XML elements that occur between the start and end tags of the "parent" node.

XML accommodates an infinite number of database schemas. Within each schema, a "dictionary" of element names is defined. The dictionary of element names defined by a schema is referred to as a "namespace." Within an XML document, element names are qualified by namespace identifiers. When qualified by a namespace identifer, a tag name appears in the form "[namespace]:[tagname]". This model enables the same element name to appear in multiple schemas, or namespaces, and for instances of these duplicate element names to appear in the same XML document without colliding.

Start tags can declare an arbitrary number of "attributes" which declare "property values" associated with the element being declared. Attributes are declared within the start tag using the form "<[tagname] [attribute1], [attribute2] . . . , [attributeN]>", where an attribute1 through attributeN are declarations of an arbitrary number of tag attributes. Each attribute declaration is of the form "[attributeName]=[attributeValue]" where each attribute is identified by a unique name followed by an "=" character, followed by the value of the attribute.

Within an XML document, namespace declarations occur as attributes of start tags. Namespace declarations are of the form "xmlns:[prefix]=[uri]". A namespace declaration indicates that the XML document contains element names that are defined within a specified namespace or schema. Prefix is an arbitrary designation that will be used later in the XML document as an indication that an element name is a member of the namespace declared by uri. The prefix is valid only within the context of the specific XML document. "Uri" or universal resource indicator is either a path to a document describing a specific namespace or schema or a globally unique identifier of a specific namespace or schema. Uri is valid across all XML documents. Namespace declarations are "inherited", which means that a namespace declaration applies to the element in which it was declared as well as to all elements contained within that element.

Namespace inheritance within an XML document allows non-qualified names to use "default" namespaces. Default namespaces are explicitly declared as attributes of start tags. Default namespace declarations are of the form "xmlns=[uri]". Note that the declaration of a default namespace is equivalent to the declaration of a non-default namespace but the prefix is omitted A namespace specification within an XML document is said to have a "scope" which includes all child nodes beneath the namespace specification.

One exemplary usage of XML is the exchange of data between different entities, such as client and server computers, in the form of requests and responses. A client might generate a request for information or a request for a certain server action, and a server might generate a response to the client that contains the information or confirms whether the certain action has been performed. The contents of these requests and responses are "XML documents", which are sequences of characters that comply with the specification of XML. Part of the document exchange process between clients and servers involves parsing the XML documents when they are received. In many cases, it is convenient to represent these XML documents in memory as a hierarchical tree structure. Once the hierarchical tree structure is built, the actual parsing process can begin. Consider the following exemplary XML code:

```
<trans:orders xmlns:person="http://www.schemas.org/people"
              xmlns:dsig=http://dsig.org
              xmlns:trans="http://www.schemas.org/transactions">
   <trans:order>
      <trans:sold-to>
         <person:name>
            <person:last-name>Layman</person:last-name>
            <person:first-name>Andrew</person:first-name>
         </person:name>
      </trans:sold-to>
      <trans:sold-on>1997-03-17</sold-on>
      <dsig:digital-signature>1234567890</dsig:digital-signature>
   </trans:order>
</trans:orders>
```

This code includes three XML namespace declarations that are each designated with "xmlns". The declarations include a prefix, e.g. "person", "dsig" and "trans" respectively, and the expanded namespace to which each prefix refers, e.g. "http://www.schemas.org/people", "http://dsig.org", and "http://www.schemas.org/transactions" respectively. This code tells any reader that if an element name begins with "dsig:" its meaning is defined by whoever owns the "http://www.dsig.org" namespace. Similarly, elements beginning with the "person:" prefix have meanings defined by the "http://www.schemas.org/people" namespace and elements beginning with the "trans" prefix have meanings defined by the http://www.schemas.org/transactions namespace. It is important to note that another XML document that incorporated elements from any of the namespaces included in this sample might declare prefixes that are different from those used in this example. As noted earlier, prefixes are arbitrarily defined by the document author and have meaning only within the context of the specific element of the specific document in which they are declared.

Namespaces ensure that element names do not conflict, and clarify who defined which term. They do not give instructions on how to process the elements. Readers still need to know what the elements mean and decide how to process them. Namespaces simply keep the names straight.

FIG. 1 shows how the structure of the above code can be represented in a hierarchical tree structure. In FIG. 1, all of the elements or nodes are set out in an exemplary tree that represents the XML document. Such a structure is typically constructed in memory, with each node containing all data necessary for the start and end tags of that node.

It has been typical in the past to build the entire tree structure, such as the one shown in FIG. 1, before parsing the XML document. For large XML documents, this can consume a great deal of memory and processor time. Thus, it would be desirable to avoid this process if at all possible.

XML parsers are used to various applications to process XML documents. Parsers must know what particular elements mean and how to process them. Tags from multiple namespaces can be mixed, which is essential with data coming from multiple sources across the Web. With namespaces, both elements could exist in the same XML-based document instance but could refer back to two different schemas, uniquely qualifying their semantics. Parsers typically take the form of a code library that can be used by developers in conjunction with higher level languages such as C++ or Java. Using functions provided by such a code library, developers can access the structure of an XML document, enumerate its elements and their attributes, and manipulate the information that is contained within the document's prolog. A simple example would be an XML parser utility that checks for "well-formed" or "valid" documents, and serves as the equivalent of an syntax checker.

XML parsers typically read XML files or data streams and construct a hierarchically structured tree, such as the one appearing in FIG. 1, as a data structure in memory. The XML parser then typically hands off this data structure data to viewers and other applications for processing. So, in the example XML code discussed above, a parser would first build the entire tree structure that is shown in FIG. 1 prior to interpreting the contents of the document. Only after the entire tree structure was built in memory would the parser begin to interpret the document.

One problem that is associated with XML parsers such as this is that they have to build an entire hierarchically structured tree in memory before interpreting the contents of the document. This approach is not efficient because of the demands it places on the memory that is required to store the tree structure and the speed with which information can be conveyed to a client. For example, this type of approach is not efficient for an application that is doing work in connection with a large quantity of XML data that might be streaming in at a relatively slow speed. Consider, for example, that a client asks a server for a list of all messages of a certain type that are in a certain folder. The entire message list is going to be returned by the server as one large data stream. If the client has to wait for the entire message list to be returned from the server, then the client cannot begin to display any portion of the list until all of the data has been received. Furthermore, this process requires the parser to make at least two passes over the data; the first pass to build the tree structure, and the second pass to traverse the nodes of the tree to interpret the contents of the document. This approach requires a large memory overhead (for storing the XML data and building the hierarchical tree structure) which, in turn, impacts the speed with which responses can be used by client applications.

This invention arose out of concerns associated with providing improved XML parsers and methods of parsing XML data streams that reduce memory overhead and increase the speed with which XML data can be provided and used by a client

SUMMARY

Various embodiments can parse an XML data stream without requiring that an entire hierarchical tree structure be built and stored in memory in conjunction with parsing activities.

Various parsing support structures are defined that enable the inventive parsing activities. An element stack is defined and used as a way to organize parsing activities and maintain a definable place within the structure of an XML data stream as it is received. During parsing activities the element stack grows and shrinks in connection with how deep into an XML data stream the parser goes.

A namespace hierarchy is defined as the XML data stream is received. In one described embodiment, the namespace hierarchy is a collection of namespace objects that each represent a namespace specification that is encountered in the XML data stream. Each object includes a namespace specification and, in the case of non-default namespace, a namespace prefix. Within the hierarchy, namespace objects refer to their parent. The namespace hierarchy is used for mapping a particular encountered namespace specification into a unique value that represents both the namespace specification and an element tag in which the namespace occurs.

A dictionary collection is defined and includes one or more dictionaries. Each dictionary is specifically associated with a namespace specification that is encountered in the XML data stream. The dictionaries contain one or more entries for one or more tag names, and a globally unique token that is associated with each tag name. The token is returned and placed on the element stack, along with another special value that enables the proper state to be maintained during processing of the XML data stream.

When an XML element is encountered, the element stack is used to organize parsing activities as the parser makes its way through the XML data stream. During parsing activities, various notifications are generated by the parser and sent to the client or application when various events occur. Exemplary notifications include, without limitation, those that are sent when: a new tag is encountered, the children of a tag are entered, data is encountered within a tag, and a close tag is encountered. These notifications can be used to organize parsing activities. For example, when notification is received that a new tag has been encountered, the element can be pushed onto the element stack. Similarly, when notification is received that a close tag has been encountered, the top frame can be removed from the element stack.

BRIEF DESCRIPTION OF THE DRAWINGS

FIG. 5 is a diagram of an exemplary element stack in accordance with one embodiment of the invention.

FIG. 6 is a diagram of a namespace hierarchy in accordance with one embodiment of the invention.

FIG. 8 is a diagram of a dictionary collection in accordance with one embodiment of the invention.

FIG. 12 is a diagram of a hypothetical hierarchical tree that represents an XML data stream.

FIG. 13 is a diagram of a namespace hierarchy that corresponds to the FIG. 12 hierarchical tree.

FIG. 14 is a diagram of an element stack that corresponds to the namespace hierarchy of FIG. 13.

FIG. 17 is a diagram of a namespace stack in accordance with one embodiment.

FIG. 18 is a diagram of an exemplary name object that is produced from the FIG. 17 namespace stack.

FIG. 19 is a diagram of an exemplary name object that is produced from the FIG. 17 namespace stack.

DETAILED DESCRIPTION

Overview

Figure 1:
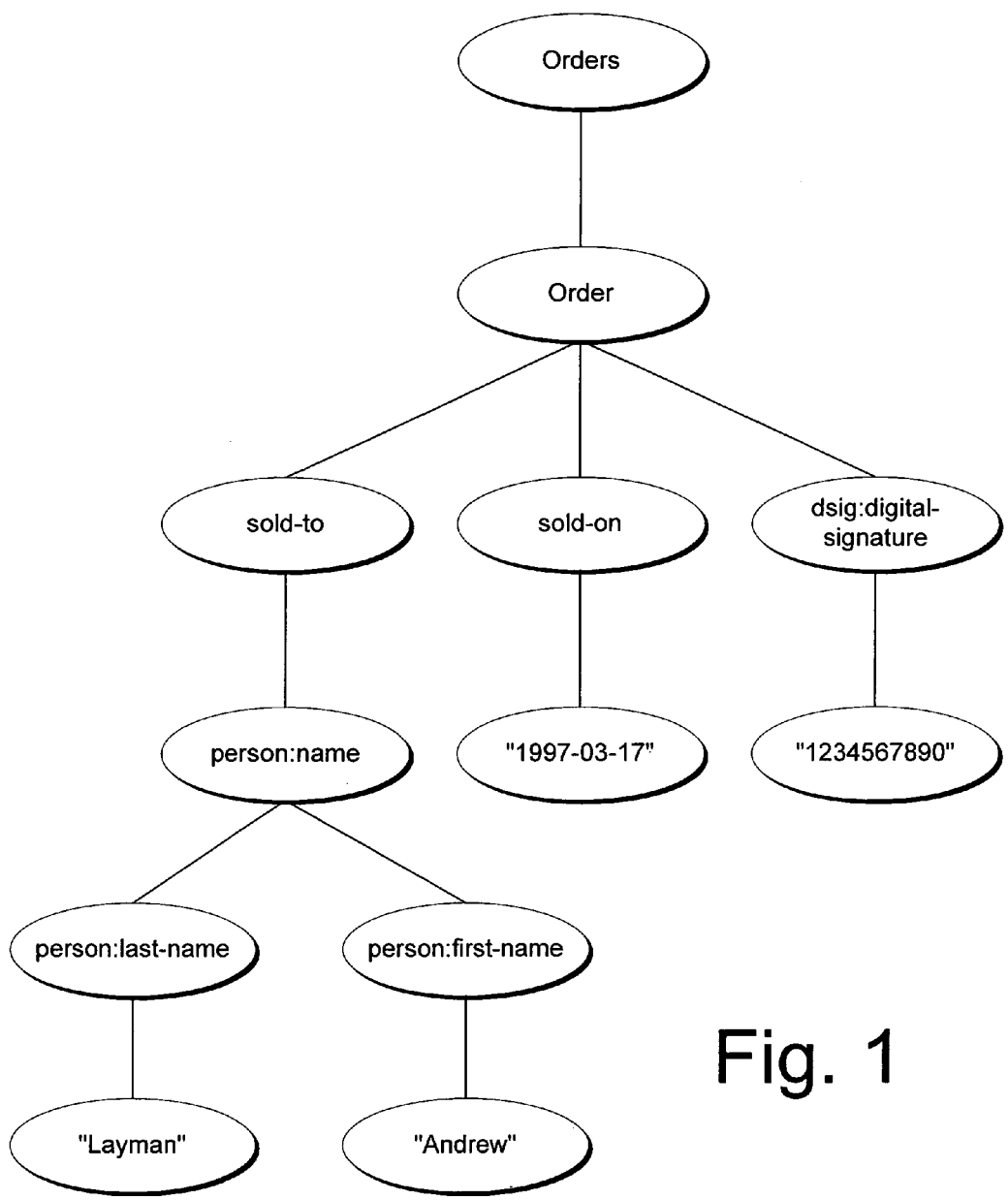
FIG. 1 is an exemplary hierarchical tree structure that represents an XML document that is discussed in the "Background" section.

A system as described below enables an XML data stream to be parsed without the need to build a hierarchical tree structure for an XML document. The XML data stream is parsed as the data stream is received. This saves memory overhead and increases the speed with which data can be provided to the client or application. In the described embodiment, an element or namespace stack is utilized as a way of organizing parsing activities and maintaining a definable place within the structure of the XML document. The element or namespace stack has a plurality of frames that are used to hold data during the parsing activities.

Various other structures work together with the element or namespace stack to facilitate piecewise parsing of the XML data stream as it is received. For example, a namespace hierarchy is built and maintained as the XML data stream is received. The namespace hierarchy is a collection of namespace objects that each represent a namespace that is encountered in the XML data stream. Each object includes a namespace prefix and an associated namespace specification or value. Some of the objects include a reference to another namespace object that is its parent. This structure creates a hierarchical organization that is used for mapping a particular encountered namespace specification into a unique value that represents both the namespace specification and an element tag in which the namespace specification occurs.

Another structure that assists in the parsing function is a dictionary collection that contains one or more dictionaries. Each dictionary is specifically associated with a namespace specification that may occur in the XML data stream. The dictionaries contain entries for one or more tag names and each name's associated unique token. The token is the unique value mentioned above. The token is returned and placed on the element stack along with another special value that enables the proper state to be maintained during processing of the XML data stream. In addition, the stack also includes a text accumulation buffer that can hold any text that is contained within an element (between the element tags).

When an XML element is encountered, the element stack is used to organize parsing activities as the parser makes its way through the XML data stream. During parsing activities, various notifications are generated by the parser and sent to the client or application when various events occur. Exemplary notifications include, without limitation, those that are sent when: a new tag is encountered, the children of a tag are entered, data is encountered within a tag, and a close tag is encountered. These notifications can be used to organize parsing activities. For example, when notification is received that a new tag has been encountered, the element can be pushed onto the element stack. Similarly, when notification is received that a close tag has been encountered, the top frame can be removed from the element stack.

Exemplary Computer System

Figure 2:
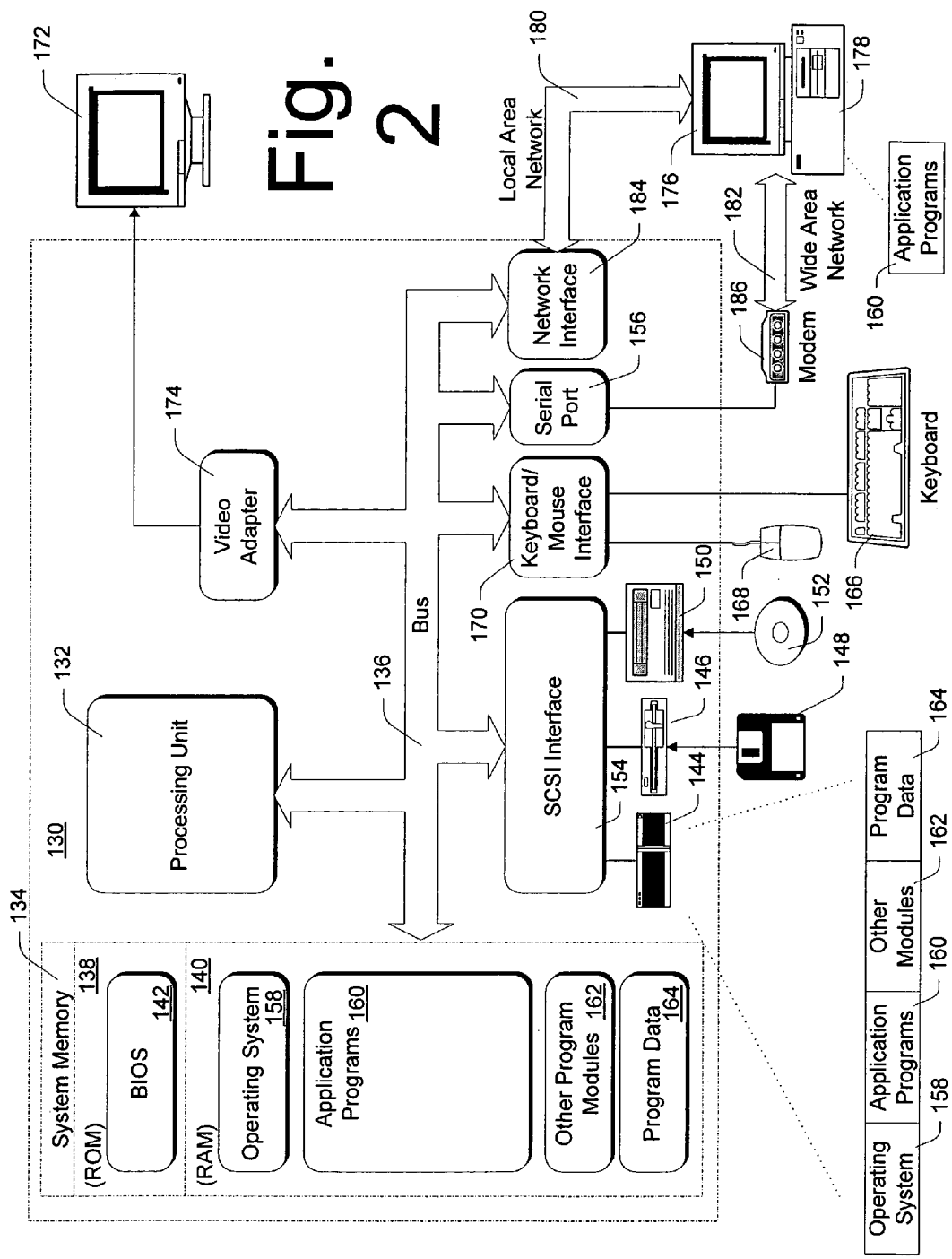
FIG. 2 is a diagram of a computer system that can be used to implement various embodiments of the invention.

FIG. 2 shows a general example of a computer 130 that can be used in accordance with the invention. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Parser Architecture

Figure 3:
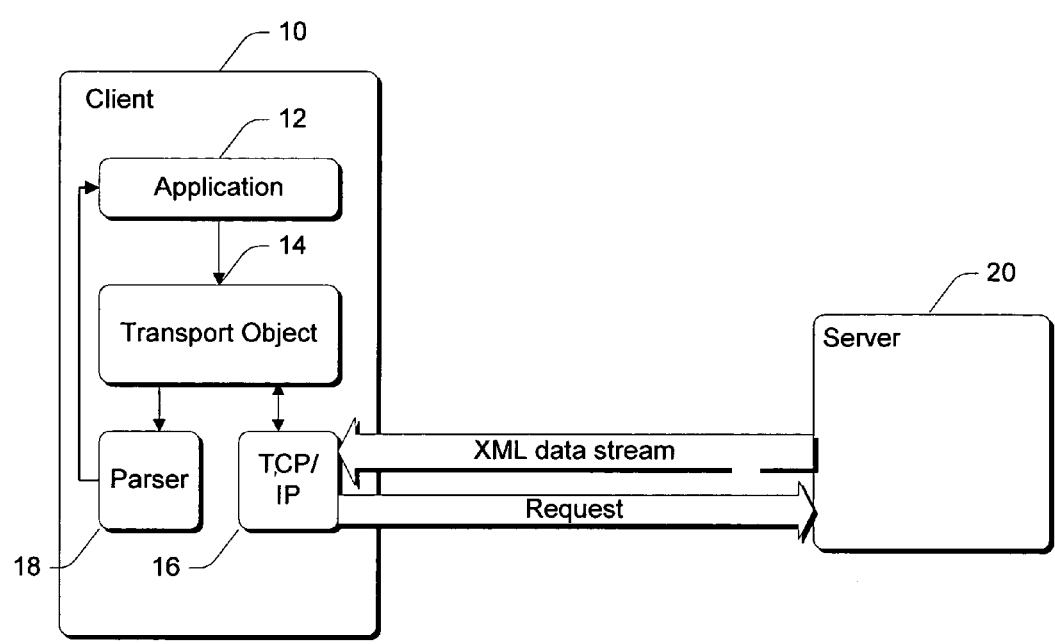
FIG. 3 is a block diagram that illustrates an exemplary XML parser architecture.

Before describing the various inventive methods and structures that are used in implementing the various parsing functions described below, reference is made to FIG. 3 which shows but one example of an architecture that is suitable for use in connection with various embodiments of the invention. It is to be understood that the architecture that is described constitutes but one example and is not intended to limit the invention in any way.

A client is shown generally at 10 and includes an application 12, a transport object 14, a TCP/IP module 16 and a parser 18. An exemplary application is one that generates requests for XML data that are sent to transport object 14, and receives responses to its request in the form of XML data streams that must be parsed. One specific example of an application is Microsoft's Outlook Express. Transport object 14 can be any transport object that is used in connection with sending and receiving requests. In one specific example that transport object can be a Distributed Authoring and Versioning (DAV) transport object that is designed to work in connection with DAV requests and responses. Specific examples of these are given later in the document. The TCP/IP module 16 can be any suitable module. In operation, an application typically generates a request that will be sent through the transport object 14 and the TCP/IP module 16 to a server 20. The server receives the request, processes it, and returns an XML data stream to the client. The XML data is received into the TCP/IP module 16 and the transport object 14. The transport object will then begin pushing the data into the parser 18. The parser 18 then begins to operate on the XML data stream by parsing it and providing it to the application 12. In this example, parser 18 is a so-called "push-model" parser because XML data is pushed into it by the transport object 14.

Processing Overview

Figure 4:
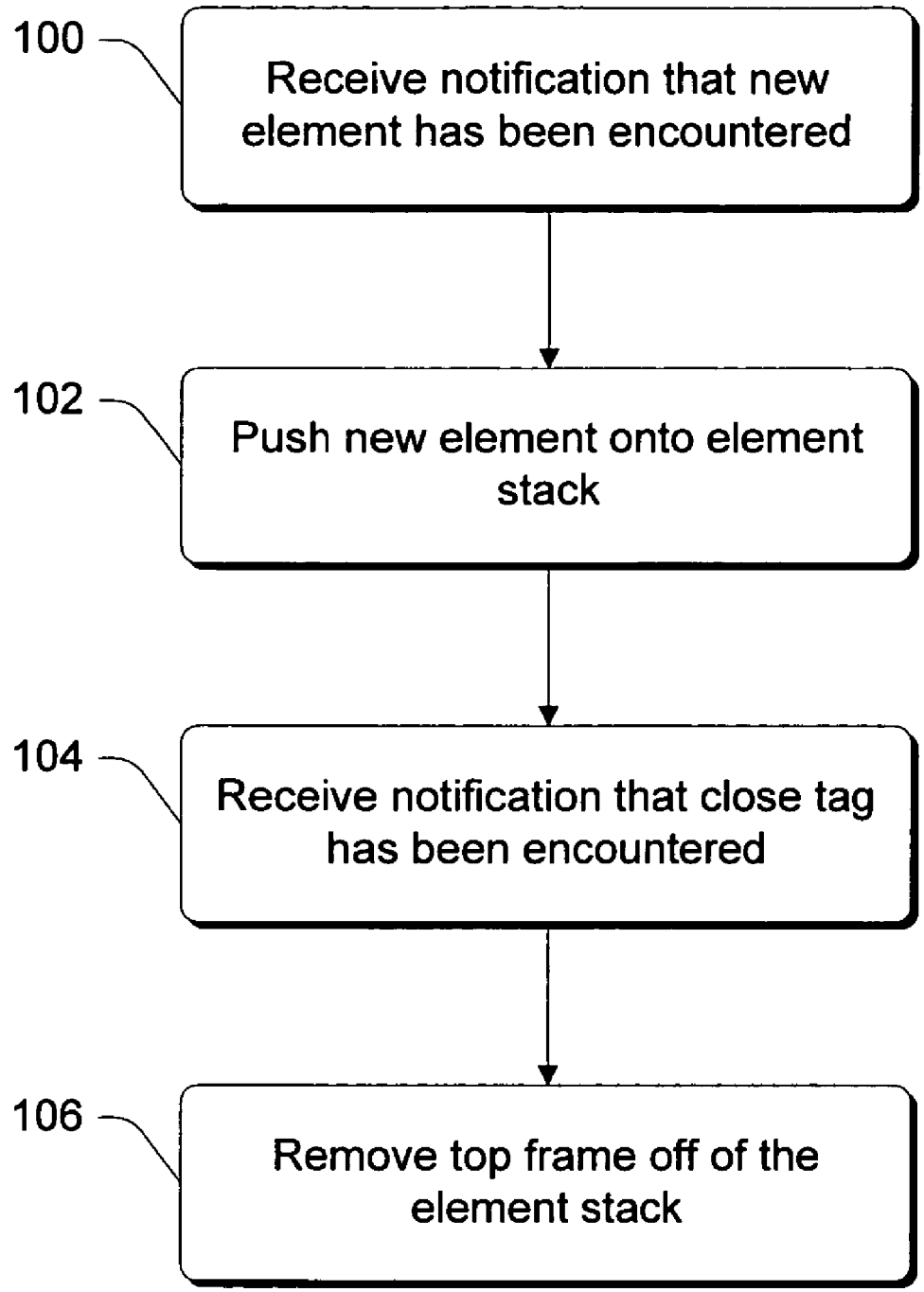
FIG. 4 is a flow diagram that describes steps in a method in accordance with one embodiment of the invention.

FIG. 4 shows a high level flow diagram that generally describes the processing that takes place as XML data is received and parsed. The client receives a notification that is generated by the parser 18 that a new element has been encountered at step 100. This happens when a start tag is encountered. When notification is received, the new element is pushed onto the element stack (step 102). The element stack includes a plurality of frames, each of which includes a frame portion for holding a value that is uniquely associated with a namespace specification and an element tag, a frame portion for maintaining a special value that is associated with a defined namespace specification (discussed below), and a text buffer for accumulating any text that might be contained between an element's tags. At step 104, notification is received that a close tag has been encountered. Consequently, the top frame of the element stack is removed at 106. In connection with removing the top frame, any text that has been accumulated in the text buffer can be processed. When the text is processed, it is provided to the application 12. Hence, data can be provided to the application before the entire XML data stream has been processed by the parser. In addition, the parser does not need to build a hierarchical tree structure in order to carry out parsing activities. This not only saves processing overhead, but reduces the time that an application must wait in order to receive and operate upon its data.

Parsing Support Structures

Various parsing support structures are utilized to facilitate the piece-wise parsing described above. These structures represent improvements over those structures that are used in connection with XML parsing activities that require a hierarchical tree structure that represents an XML document to be built and stored in memory before parsing activities begin. Exemplary parsing support structures include an element stack, a namespace hierarchy, and a dictionary collection.

Element Stack

FIG. 5 shows a data structure 200 in the form of an element stack that includes a plurality of frames 202, 204, and 206. Each frame includes a plurality of frame portions which, in this example, are shown for frame 202 at 202a, 202b, and 202c. Each frame is configured to hold a representation that represents a namespace specification and an element tag of an XML data stream. In this example, frame portion 202*a* holds an element tag token, frame portion 202*b* holds a value that is designated "oldTopNamespace" which is explained in more detail below, and frame portion 202*c* is a text accumulation buffer that is configured to hold text that is encountered within an element tag in the XML data stream.

Namespace Hierarchy

FIG. 6 shows a namespace hierarchy 300 that is built during parsing of the XML data stream. The namespace hierarchy is used to organize namespace specifications so that they can be mapped into a unique token value that is placed on the element stack during parsing. The illustrated namespace hierarchy has two exemplary namespace objects 302, 304. Namespace object 302 is the parent of namespace object 304. Namespace object 302 has no parent namespace object. Each namespace object contains a reference to a dictionary that is associated with the namespace object. Dictionaries are discussed below in more detail.

The process of building a namespace hierarchy having namespace objects involves looking at the XML data stream as it is received and extracting certain information from it. As a simple example, consider the following excerpt of an XML data stream:

| <D:multistatus | xmlns:D = "DAV" |
| | xmlns:G = "FOO"> |

The above code illustrates a portion of a "multistatus" tag. This is the element name or tag name. This is a special type of response that can be received and processed in accordance with the invention. The "D" preceding the "multistatus" is the namespace prefix, as is the "D" and "G" preceding "DAV" and "FOO" respectively. The "xmlns" is an attribute called the namespace declaration. "DAV" and "FOO" are expanded namespaces or namespace specifications that are represented within the multistatus response by their respective prefixes.

Figure 7:
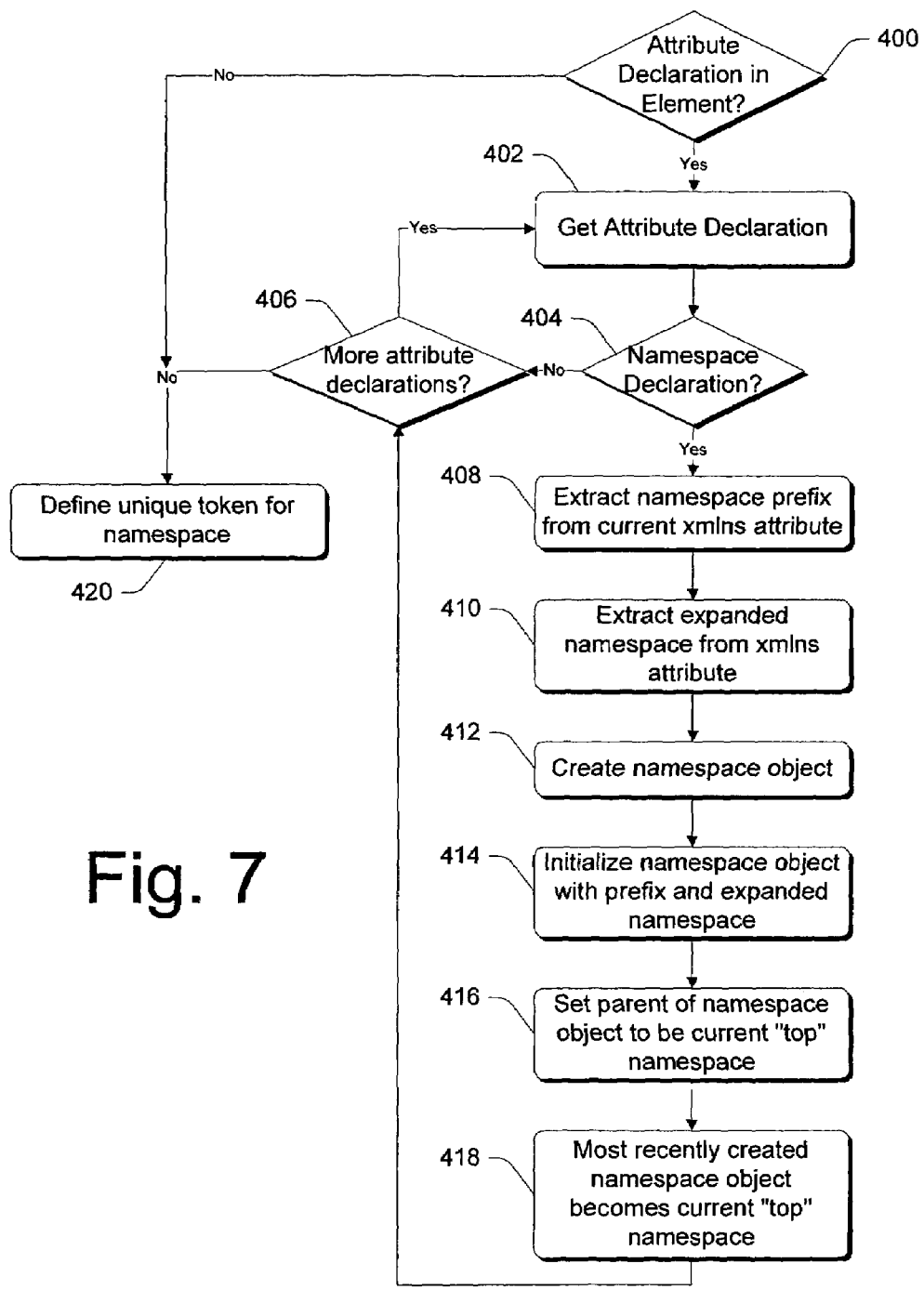
FIG. 7 is a flow diagram that describes steps in a method in accordance with one embodiment of the invention.

FIG. 7 shows a flow diagram that describes steps in a method to build namespace hierarchy 300 in FIG. 6. When the above XML data stream is received, step 400 determines whether there are any attribute declarations in the multistatus element. If there are no attribute declarations, then the method branches to a method (step 420) that retrieves a unique token for the namespace prefix of the element ("D" in this case) and the element name ("multistatus"). If there are attribute declarations, as there are here, step 402 gets the first attribute declaration (i.e. xmlns:D="DAV") and step 404 determines whether it is a namespace declaration or specification. If it is not a namespace declaration or specification, the method branches to step 406 which determines whether there are any more attribute declarations. If there are, steps 402 and 404 are repeated. If not, then step 406 branches to the method (step 420) that defines a unique token for the namespace prefix of the element.

Because step 404 determined that the first attribute declaration was a namespace declaration or specification, a namespace object is built for the namespace. To do this, step 408 extracts the namespace prefix from the current xmlns attribute. Here, step 408 extracts the "D" from the namespace declaration for "DAV". Step 410 extracts the expanded namespace specification from the xmlns attribute, e.g. "DAV". Step 412 creates a namespace object, such as 302 (FIG. 6). An exemplary object is a C++ object. Step 414 initializes the namespace object just created with the prefix and the expanded namespace specification. Step 415 searches for a dictionary that is associated with the expanded namespace and, if one is located, sets the dictionary reference within the namespace object. Step 416 then sets the parent of the namespace object to be the current "top" namespace. If this is the first namespace declaration in the XML data stream, there will be no current "top" namespace. In FIG. 6, this is shown diagrammatically by a parent pointer for the namespace object 302 that points to nothing. Step 418 then assigns the most recently-created namespace object the current "top" namespace. Step 418 branches to step 406 to determine whether there are any more attribute declarations (step 406). If there are, the method processes through the above-described steps. Doing so, in this example, creates the namespace object 304 that points to its parent namespace object 302. This effectively builds a linked list of namespaces.

The namespace hierarchy is a useful structure to keep track of the namespace specifications that might be declared in the XML data stream. As namespace specifications can be declared inside any element within the XML tree, keeping track of their hierarchical occurrence and place in the hierarchy becomes important. That is, maintaining the state of the namespace hierarchy during parsing activities is important if proper parsing is to take place.

Dictionary Collection

FIG. 8 shows a dictionary collection 500 that includes dictionaries that are defined for each of the namespace specifications encountered in the XML data stream above. Specifically, dictionary 502 is defined for the "DAV" namespace specification and dictionary 504 is defined for the "FOO" namespace specification. Each dictionary includes a tag name field 506 and a token field 508. The tag name field 506 holds the tag names that might be encountered in each XML data stream. For example, in a "multistatus" element tag, one will encounter the "multistatus" tag and possibly a "propfind" tag. Other tags can, of course, be encountered. The token field 508 holds token values for each of the associated tag names appearing in the tag name field. The token value is a unique constant value, such as a UUID (universally unique ID) that represents both the namespace specification and the tag name. In the illustrated example, the token values are shown as text characters to illustrate the fact that each uniquely represents the namespace specification and the tag name with which it is associated.

Processing an XML Data Stream

Figure 9:
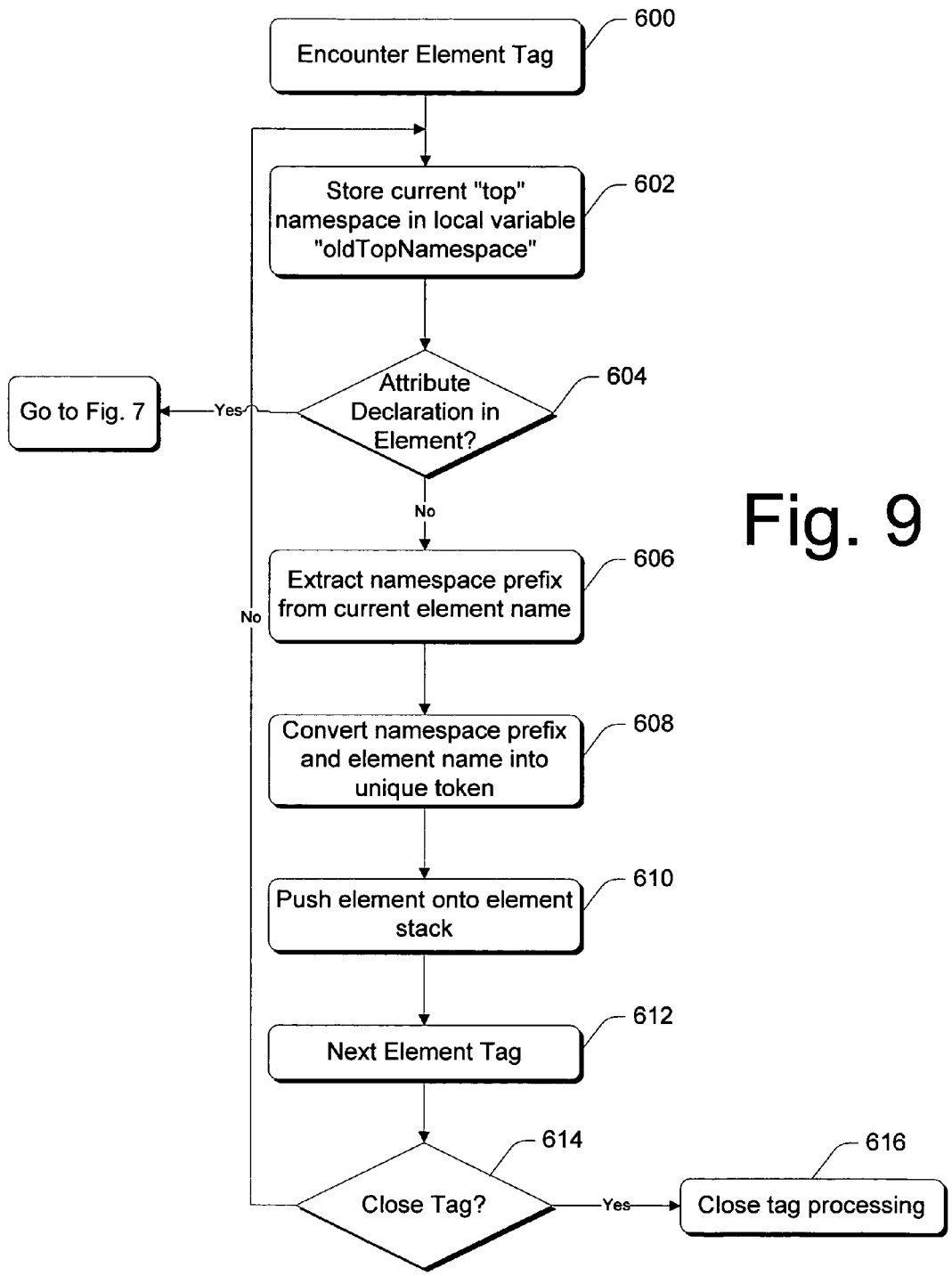
FIG. 9 is a flow diagram that describes steps in a method in accordance with one embodiment of the invention.
Figure 10:
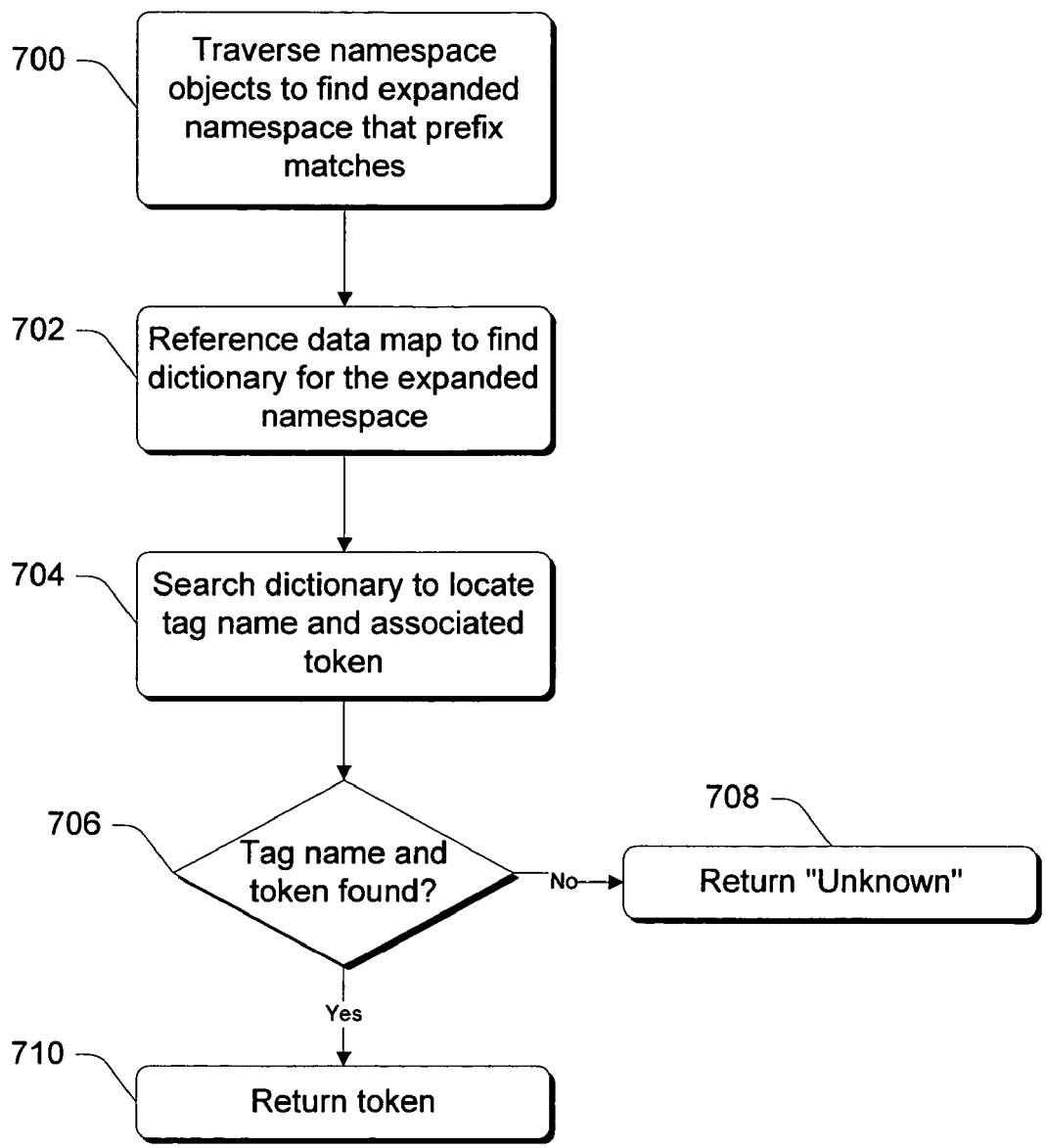
FIG. 10 is a flow diagram that describes steps in a method in accordance with one embodiment of the invention.
Figure 11:
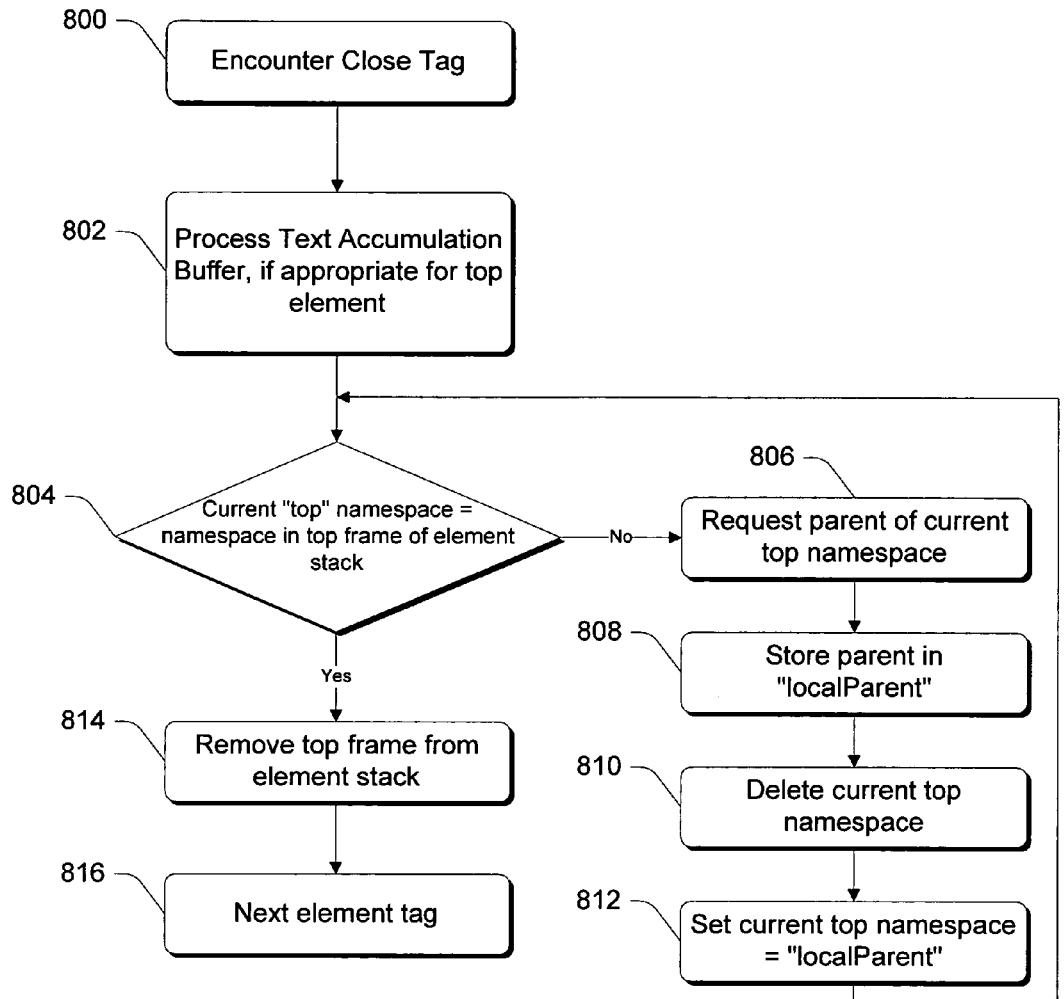
FIG. 11 is a flow diagram that describes steps in a method in accordance with one embodiment of the invention.

FIGS. 9–11 are flow diagrams that describe steps in a method for processing an XML data stream. The steps described below are used in connection with the parsing support structures described above. Accordingly, reference will periodically be made to FIGS. 5–8 in the description that follows.

The processing that is described just below uses the element stack to track the occurrences of namespace declarations that occur within the XML data stream. As the XML data stream is received and processed by the parser, the parser begins to send notifications to the client as certain events occur. One of these events occurs when a start tag for an element is encountered, and another of the events occurs when a close tag for an element is encountered. When notification is received that a new element tag is encountered, the element is pushed onto the element stack. The process of pushing an element onto the element stack is described in FIG. 9.

There, step 600 encounters an element tag. During parsing activities there is state data that gets maintained across the parsing process. One piece of the state data that gets maintained is defined as the "top namespace." The "top namespace" is a variable that is used to track namespace specifications within the namespace hierarchy. Initially, there is no "top namespace" because parsing activities have not yet begun. When an element tag is encountered, step 602 stores the current "top namespace" in a local variable called "oldTopNamespace". The reason that it is stored locally is because the processing of an element will change the value of the "top namespace". By storing it locally, reference can later be made to the current "top namespace" as it existed before the element was processed. Step 604 determines whether there are any attribute declarations in the element (this step is identical to step 400 in FIG. 7). If there are attribute declarations in the element, then processing takes place as was described in connection with FIG. 7. For namespace declarations this results in building the namespace hierarchy. If there are no attribute declarations or, if all of the attribute declarations have been processed as set forth in FIG. 7, then the method creates a unique token for the current element (element name) and its prefix.

Creation of Unique Token

Recall that in the example given above, a namespace hierarchy 300 (FIG. 6) and a dictionary collection 500 (FIG. 8) were created for the excerpted XML data stream below:

| | |
|---|---|
| <D:multistatus | xmlns:D = "DAV" |
| | xmlns:G = "FOO"> |

Recall also that step 418 redefined the current "top" namespace to be "FOO" (see the namespace object 304 in FIG. 6). To create the unique token, step 606 first extracts the namespace prefix from the current element name. Here, this is the "D" that is the prefix for the "multistatus" tag name. Using the extracted prefix from step 606, step 608 converts the namespace prefix and element tag name into a unique token.

FIG. 10 shows a flow diagram that describes an exemplary method of converting the namespace prefix and element name into a unique token. Step 700 traverses the namespace objects to find an expanded namespace specification that has a prefix that matches the prefix extracted in step 606 (FIG. 9). In this example, step 700 looks through the individual namespace objects in namespace hierarchy 300 (FIG. 6) to find the prefix "D" that matches the "D" extracted from the current element tag. The first namespace object that is checked is namespace object 304. This object contains a prefix "G" which does not match the "D" from the current element tag. Step 700 then moves onto the parent namespace object 302. Here there is a match between the prefixes "D". Step 702 then uses the expanded namespace specification for the prefix that matched (i.e. "DAV") and references a data map to find a dictionary for that expanded namespace specification. Here, step 702 gets the dictionary from the dictionary reference that the namespace object contains. Step 704 then searches the dictionary to locate the tag name and its associated token. In this example, step 704 looks for the "multistatus" entry in the dictionary. When it finds this entry at step 706, it returns the token (step 710) that is associated with the "multistatus" entry—here "DAV-MULTISTATUS". If the tag name is not found, step 708 returns an "Unknown" message. The "DAV-MULTISTATUS" token is a constant and is guaranteed to be unique no matter how many namespace specifications appear in the XML data stream.

The purpose of converting the namespace prefix and element name into a unique token is to ensure that namespaces do not collide. The token implies both the namespace specification and the element tag name. Accordingly, there will be one and only one mapping for "D:multistatus".

Returning to FIG. 9, after converting the namespace prefix and element name into a unique token, step 610 pushes the element onto the element stack (FIG. 5). The element stack has individual frames 202, 204, and 206. Each frame has a plurality of frame portions. Frame portions are shown for frame 202 at 202*a*, 202*b*, and 202*c*. Frame portion 202*a* holds the element tag token that is returned from step 710 (FIG. 10). Along with the element tag token, frame portion 202*b* holds a variable called "oldTopNamespace". Recall that the "oldTopNamespace" variable is a local variable that holds the value of the current "top" namespace (step 602 in FIG. 9). The current "top" namespace value can, however, change because each time a namespace specification is encountered in the XML data stream, the namespace hierarchy grows by a corresponding namespace object. Each time a namespace object is added, it becomes the new current "top" namespace (step 418 in FIG. 7). The "oldTopNamespace" variable is used to maintain the state of the namespace hierarchy as the parser moves into and out of different layers of the XML data stream. For example, when a close tag is encountered for an element, any namespace specifications that were declared in that element are no longer valid. This is because the namespaces have a life span that is only equal to the lifespan of the stack frame that represents the element in which they are declared. Accordingly, as will become apparent below, the "oldTopNamespace" variable provides a way to return the namespace hierarchy to the state that it was in before the top stack frame was pushed onto the stack.

Step 612 then looks for the next element tag. Step 613 tests whether or not an element tag is found. If no element tag is found, then processing is terminated. If an element tag is found and is not a close tag (step 614), then the method branches back to step 602. If the element tag that is encountered is a close tag, the step 614 branches to a close tag processing step 616. Step 616 then loops back to step 612 to pick up the next element tag, if there is one.

Close Tag Processing

FIG. 11 shows a flow diagram that describes steps in a method for close tag processing. Step 800 encounters the close tag. When a close tag is encountered, the parser sends a notification to that effect to the client. When the notification is received, any text that is in the text accumulation buffer of the top frame of the element stack 200 (FIG. 5) is processed. This can involve displaying text for a client to view, or any other action that is contextually appropriate. Step 804 then determines whether the current "top" namespace is equal to the namespace in the top frame of the element stack. If they are not equal, then step 806 requests the parent of the current "top" namespace. The parent is stored in a variable "localParent" at step 808. Step 810 deletes the current "top" namespace and step 812 then sets the current top namespace to "localParent". Step 812 then returns to step 804 to compare the current "top" namespace with the namespace in the top frame of the element stack. If they are equal, then step 814 removes the top frame from the element stack and step 816 looks for the next element tag. This process keeps rolling back through the namespace hierarchy so that it can be placed into the state that it was in when that element was pushed onto the element stack.

EXAMPLE

As a simple example that illustrates how the element stack is used during parsing activities, and how the state of the namespace hierarchy is maintained through the use of the element stack, consider FIGS. 12–14. FIG. 12 is a diagram that represents a hypothetical hierarchical tree that represents an XML data stream. Each element is represented by a letter-here letters A through C. Namespace declarations or specifications take place at elements A (ns1 and ns2) and B (ns3).

During processing of the XML data stream, the element tag for A is encountered. When this happens, processing takes place as described in connection with FIG. 9. The current "top" namespace is stored in a local variable "oldTopNamespace" (step 602 in FIG. 9). Here, since there is no current "top" namespace, nothing is stored. In addition, the element is checked for namespace declarations and if there are any, namespace objects are built (FIG. 7) and arranged into a namespace hierarchy. Thus here, there are two namespaces declared—"ns1" and "ns2" in element A. After processing through the namespace specifications, namespace objects for "ns1" and "ns2" are created as shown in FIG. 13. The namespace prefix and element name are converted into a unique token ("$A_{token}$") and the element is pushed onto the element stack. At this point in FIG. 14, only the lower frame holding "$A_{token}$" would be on the element stack. After processing through element A, the following values exist for "oldTopNamespace" and current "top" namespace:

| OldTopNamespace | Current "top" namespace |
| --- | --- |
| 0 | "ns2" |

When element B is encountered, processing takes place as described above. First, the current "top" namespace specification "ns2" is stored in "oldTopNamespace". Since element B includes a new namespace declaration (i.e. "ns3"), it is processed into the namespace hierarchy of FIG. 13 and "ns3" becomes the current "top" namespace. Element B's namespace prefix and element name are converted into a unique token (step 608) and the element is pushed onto the element stack (step 610). At this point in the processing, the following values exist for "oldTopNamespace" and current "top" namespace:

| OldTopNamespace | Current "top" namespace |
| --- | --- |
| "ns2" | "ns3" |

The value of "oldTopNamespace" is only important between the time it is saved when a new tag is encountered, and the time that the new element is pushed onto the stack. When element C is encountered, processing takes place as described above. The current "top" namespace specification "ns3" is stored in "oldTopNamespace" and, since there are no namespace declarations, element C's namespace prefix and element name are converted into a unique token. Element C is then pushed onto the stack as shown in FIG. 14. At this point in the processing the following values exist for "oldTopNamespace" and current "top" namespace:

| OldTopNamespace | Current "top" namespace |
| --- | --- |
| "ns3" | "ns3" |

Up to this point, no close tags for any of the elements have been encountered—only start tags have been encountered when a new element is encountered. Since element C is the last in its branch, a close tag will be encountered for it. When this happens, the close tag processing that is described in FIG. 11 takes place. First, any text that is present in the text accumulation buffer for element C is processed (step 802). Next, step 804 compares the current "top" namespace with the namespace in the top frame of the element stack, As the above table indicates, the current "top" namespace specification is "ns3" and the "oldTopNamespace" in the top frame of the stack is "ns3". Since there is a match, step 814 removes the top frame of the element stack and processing continues. Next, a close tag for element B is encountered. Accordingly, any text that is present in the text accumulation buffer for element B is processed and step 804 compares the current "top" namespace to the namespace in the top frame of the element stack (i.e. "oldTopNamespace"). Here, the current "top" namespace is "ns3" and "oldTopNamespace" is "ns2". Since they do not match, steps 806–812 in FIG. 11 request the parent of the current "top" namespace (here, "ns2") and set the current "top" namespace to the parent namespace. Thus, the current "top" namespace is now "ns2". Step 804 then compares the current "top" namespace with the namespace in the top frame of the element stack. Since they are both "ns2", the top frame is removed and processing continues. Processing in this manner ensures that the state of the current "top" namespace is maintained during processing of the XML data stream. This is important if namespace collisions are to be avoided during parsing activities.

Node Factory Embodiment

Figure 15:
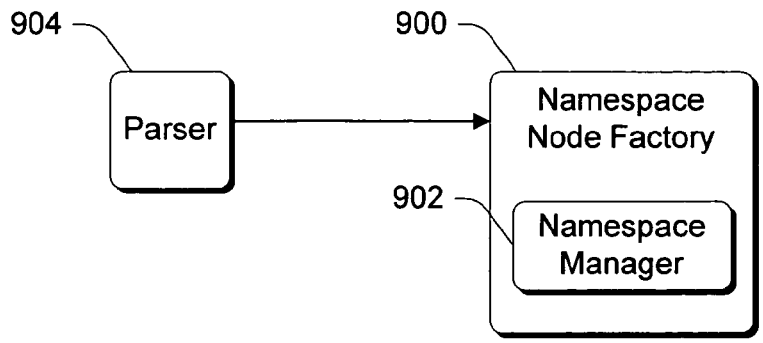
FIG. 15 is a high level system diagram of a namespace node factory in accordance with one embodiment.

FIG. 15 shows a namespace node factory 900 having an associated namespace manager 902. Together, namespace node factory 900 and namespace manager 902 provide namespace management during parsing activities. This is done in the described embodiment through a number of calls that are made by parser 904 to the namespace node factory 900 during parsing of an XML data stream. In a reduction-to-practice example, the methods and systems discussed below are implemented in connection with a DLL called MSXML.DLL that is contained in a Microsoft product called Internet Explorer 5.0 or IE 5.0. That product contains several implementations of an IXMLNodeFactory interface, one of which is called "NamespaceNodeFactory" and provides an implementation of the W3C Namespace specification. In practice, the NamespaceNodeFactory is designed so that it can be inserted between the parser and another node factory (such as a child node factory). It makes use of a NamespaceManager to add namespace support and then it passes a fully qualified name object through to the child node factory.

Figure 16:
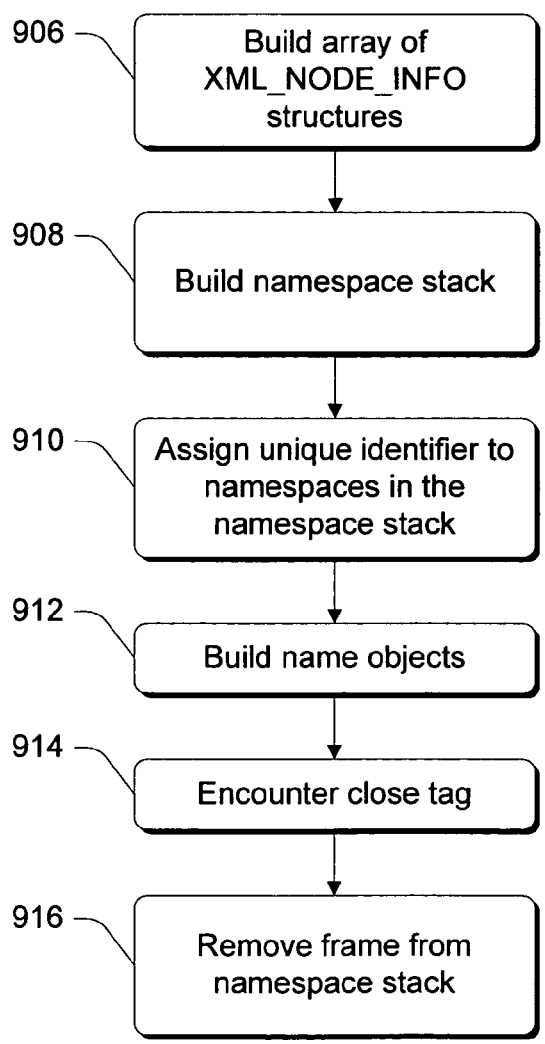
FIG. 16 is a flow diagram that describes steps in a method in accordance with one embodiment.

FIG. 16 is a flow diagram that illustrates exemplary steps in a namespace management method. Step 906 builds an array of structures when the parser 904 processes the XML data stream. An exemplary structure is an XML_NODE_INFO structure which is shown below:

```
typedef struct __XML_NODE_INFO
{
    DWORD       dwSize;
    DWORD       dwType;
    DWORD       dwSubType;
    BOOL        fTerminal;
    WCHAR*      pwcText;
    ULONG       ulLen;
    ULONG       ulNsPrefixLen;
    PVOID       pNode;
    PVOID       pReserved;
} XML_NODE_INFO;
```

| | |
|---|---|
| DWORD dwSize | The size of this structure in bytes. |
| DWORD dwType | The node type. |
| DWORD dwSubType | The node sub type. |
| BOOL fTerminal | True if this node cannot have any children and so BeginChildren and EndChildren are guaranteed not to be called for this node. |
| const WCHAR* pwcText | This is either a tag name, or a PCDATA text value. The lifetime of this pointer is the lifetime of the CreateNode call. Note that Element/Attribute/PI tag names or certain attribute values (of type ID, NMTOKEN, ENTITY, or NOTATION), may have namespace prefixes. |
| ULONG ulLen | The length of the element or attribute name. |
| ULONG ulNsPrefixLen | The length of the namespace prefix, when present. |
| PVOID pNode | This field can be used by the NodeFactory to RETURN an object representing the node. Since this is PVOID, the NodeFactory can build ANY tree representation it wants - even a raw struct hierarchy. |
| PVOID * pReserved | For private communication between factories. |

During parsing activities, the parser 904 detects whether there are any "xmlns" attribute declarations and if it finds one, it will set the pReserved field to non-zero as a flag to the namespace node factory 900 that there is an xmlns attribute in the array. This is a performance optimization so that the namespace node factory 900 does not have to repeatedly check the array. If the pReserved field is set (meaning that there is an xmlns declaration attribute in the array), step 908 builds a namespace stack. The namespace stack defines an association between expanded namespaces and prefixes for at least some of the expanded namespaces. FIG. 17 shows an exemplary namespace stack at 1000 for the following excerpt of XML code that might be encountered by parser 904:

```
<foo xmlns="urn:123"
    xmlns:x="urn:456">
    <bar xmlns:y="urn:789">
        <joe xmlns="urn:012">
            <item x:a="b"/>
        </joe>
    </bar>
</foo>
```

In the illustrated example, the namespace stack 1000 has a plurality of frames (each frame corresponds to a row). Each frame includes a prefix portion 1002, an expanded namespace portion 1004, a scope portion 1006, and a unique identifier portion 1008. The expanded namespace specifications may or may not have prefixes associated with them. The "scope" of the namespace defines the XML element within which the expanded namespace is valid. For example, the expanded namespace "urn:123" is valid within the "foo" element. In addition, there are two pointers, one called "pCurrentDefault" for pointing to the current default scope, and another called "pPreviousDefault" for pointing to the previous default scope. The namespace stack 1000 constitutes but one example of an association that can be made between the prefixes (if any), expanded namespaces, scopes, and unique identifiers that are associated with an XML data stream.

In the described embodiment, the namespace stack 1000 is built by extracting the namespace prefix out of the "xmlns:prefix" string. If there is no namespace prefix, then the prefix string appearing in the prefix pointer portion 1002 is set to "null". The expanded namespace specification for each prefix is then calculated. Namespace node factory 900 calls a method on the namespace manager 902 and passes in the namespace prefix and expanded namespace specification. The namespace manager 902 builds the namespace stack with the data that is passed in. In addition, the namespace node factory 900 also assigns a unique identifier (step 910) for each of the new namespace declarations. The unique identifier is stored in the pNode field of the XML_NODE_INFO structure and is used later during so-called cleanup processing that is described below.

Name Objects

With the xmlns declaration attributes having been processed and the namespace stack having been built, namespace scoping rules can be applied efficiently during subsequent parsing. Here, step 912 builds name objects that are used during parsing to maintain the current state of the namespace specifications. Consider the processing that takes place when the "item" element appearing just below is parsed:

```
<item x:a="b"/>
```

In this example, for each XML element and attribute, the namespace node factory 900 calls a method or function (e.g. CreateName) on the namespace manager 902 that creates a name object. Since the "item" element has no namespace prefix, it is qualified using the pCurrentDefault namespace (urn:012).

FIG. 18 shows the resultant name object that is built by this process. The illustrated name object has a prefix portion 1010 for holding a prefix that is associated with an element or attribute, an expanded namespace portion 1012 for holding an expanded namespace, and a base name value portion 1014 for holding a value that corresponds to either an XML element (in this example, the "item" tag name) or an attribute. The name object associates each element or attribute with an expanded namespace.

Consider further the XML attribute "x:a='b'" from the "item" element above. This attribute has a prefix "x". To build a name object for this attribute, step 912 checks the prefix portion 1002 of the namespace stack (starting at the bottom and working upward) until it has a match. When it finds a match for the "x" prefix, it finds the associated expanded namespace specification (here, "urn:456") and builds a name object. FIG. 19 shows the resultant name object for this attribute.

Atomization

The CreateName function that is called for each element and attribute also stores each name object in a hashtable so that the same name object can be reused. This results in less memory usage because XML documents tend to use the same element and attribute names over and over again. This is known as atomization. The child NodeFactory can also benefit from this. In the case where the child NodeFactory is building an XML DOM tree—these name objects become the names of the nodes in the tree and atomization ensures minimum memory is used.

Cleanup

Step 914 receives or encounters a close tag for the XML data stream that is being parsed. When a close tag is received, the parser 904 calls a method (here, EndChildren) on the namespace node factory 900. This method is called for each of the end tags </joe>, </bar> and </foo>. In turn, the namespace node factory 900 takes steps to ensure that the corresponding stack frame in the namespace stack (FIG. 17) is removed (step 916). In the described embodiment, the namespace node factory 900 does this by calling a method (here, PopScope) on the namespace manager 902 and passing it the unique identifier that was assigned in step 910. The PopScope method simply removes each frame from the bottom of the namespace stack that has a matching unique identifier. This means that one frame will be removed for </joe>, one frame will be removed for </bar>, and two frames will be removed for </foo>.

Additionally, if the prefix portion 1002 in the namespace stack is "null", then the pCurrentDefault pointer is reset to the pPreviousDefault. In the </joe> end tag, this means that the current default in moved back to the default namespace belonging to </foo>. Thus, clean up is quick and efficient.

Processing described in this example provides added flexibility in the management of namespaces. It does this by organizing and managing any number of namespaces that might be declared in an XML data stream. It does this by first identifying the namespace declarations that are present in an XML data stream of interest. Once the namespace declarations are known, a namespace stack is built that organizes namespace prefixes (if any), expanded namespace specifications, and their associated scope. As the XML data stream is parsed, a series of calls are made that build name objects for each of the XML element and attributes that are encountered in the data stream. When an end tag is encountered, the stack frames that are effected by the end tag are removed from the namespace stack and processing continues. Accordingly, the proper namespace state is maintained.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for parsing an XML data stream comprising:
one or more processors;
one or more computer-readable media having computer-readable instructions thereon which, when executed, implement a method comprising:
receiving an XML data stream containing a namespace prefix and an associated element tag name, the element tag name being associated with an element tag;
converting the namespace prefix and the element tag name into a token that uniquely represents a namespace specification that is associated with the namespace prefix and the element tag;
associating each token with a dictionary that contains one or more entries that are associated with a namespace specification, wherein dictionaries serve as a lookup mechanism for tokens associated with particular element tags;
defining a stack that is configured to receive one or more tokens during parsing of the XML data stream; and
placing a token from a dictionary on the stack,
said acts of receiving, converting, associating, defining and placing being configured to permit parsing of the XML data stream to begin without requiring an XML tree structure, comprising an XML document embodied by the XML data stream, to be built.

2. The system of claim 1, wherein the instructions further implement a method comprising:
receiving a close tag for an element tag; and
responsive to said receiving, removing a token from the stack that is associated with an element tag with which the close tag is associated.

3. A system for parsing an XML data stream comprising:
one or more processors;
one or more computer-readable media having computer-readable instructions thereon which, when executed, implement a method comprising:
defining a plurality of unique tokens, each token representing an XML namespace specification and an element tag name;
associating each token with a dictionary that contains one or more entries that are associated with a namespace specification, wherein individual dictionaries serve as lookup mechanisms for tokens associated with particular element tags;
using one or more dictionaries, organizing the tokens in a stack as XML element tags are encountered in the XML data stream; and
removing at least one of the tokens from the stack before another token is added to the stack,
said acts of defining, associating, organizing and removing being configured to permit parsing of the XML data stream to begin without requiring an XML tree structure, comprising an XML document embodied by the XML data stream, to be built.

4. A system for parsing an XML data stream comprising:
one or more processors;
one or more computer-readable media having computer-readable instructions thereon which, when executed, implement a method comprising:
receiving an XML data stream;
defining a data structure that comprises a plurality of frames, each frame having a plurality of frame portions;
placing a plurality of representations into respective frame portions of the plurality of frames, each representation representing a namespace specification and an element tag of the XML data stream;
associating each namespace specification with a dictionary that contains individual entries that are associated with individual respective element tags, wherein individual dictionaries serve as lookup mechanisms for tokens associated with particular element tags; and
maintaining the data structure by adding and removing representations to and from, respectively, the data structure as the XML data stream is received, wherein said representations individually include a token returned from a dictionary;

said acts of receiving, defining, placing, associating, and maintaining being configured to permit parsing of the XML data stream to begin without requiring an XML tree structure, comprising an XML document embodied by the XML data stream, to be built.

* * * * *